US007874900B2

(12) United States Patent
Ward et al.

(10) Patent No.: US 7,874,900 B2
(45) Date of Patent: Jan. 25, 2011

(54) DISPLAYING 3D CHARACTERS IN GAMING MACHINES

(75) Inventors: Matthew J. Ward, Northbrook, IL (US); Craig J. Sylla, Round Lake, IL (US); Christopher Brewer, Bloomington, IL (US)

(73) Assignee: WMS Gaming Inc., Waukegan, IL (US)

( * ) Notice: Subject to any disclaimer, the term of this patent is extended or adjusted under 35 U.S.C. 154(b) by 544 days.

(21) Appl. No.: 11/664,185

(22) PCT Filed: Sep. 28, 2005

(86) PCT No.: PCT/US2005/034939

§ 371 (c)(1),
(2), (4) Date: Mar. 29, 2007

(87) PCT Pub. No.: WO2006/039371

PCT Pub. Date: Apr. 13, 2006

(65) Prior Publication Data

US 2008/0125221 A1 May 29, 2008

Related U.S. Application Data

(60) Provisional application No. 60/615,216, filed on Oct. 1, 2004.

(51) Int. Cl.
*A63F 9/24* (2006.01)
*A63F 13/00* (2006.01)

(52) U.S. Cl. ............................................ 463/9; 463/32

(58) Field of Classification Search ..................... 463/9, 463/16, 30–32; 273/138.1, 138.2
See application file for complete search history.

(56) References Cited

U.S. PATENT DOCUMENTS

| | | | |
|---|---|---|---|
| 5,011,146 | A | 4/1991 | Lamle |
| 5,580,055 | A | 12/1996 | Hagiwara |
| 5,739,811 | A | 4/1998 | Rosenberg et al. |
| 5,889,951 | A | 3/1999 | Lombardi |
| 6,232,959 | B1 | 5/2001 | Pedersen |
| 6,315,660 | B1 | 11/2001 | DeMar et al. |
| 6,347,996 | B1 | 2/2002 | Gilmore et al. |

(Continued)

FOREIGN PATENT DOCUMENTS

JP 2002-52169 * 2/2002

(Continued)

OTHER PUBLICATIONS

Gameguru Mania's Project Entropia Interview, Dated Dec. 18, 2002 (retrieved from www.ggmania.com/full.php3?show=5493 on Sep. 22, 2009). 6 pages total.*

(Continued)

*Primary Examiner*—Dmitry Suhol
*Assistant Examiner*—Robert Mosser
(74) *Attorney, Agent, or Firm*—Schwegman, Lundberg & Woessner, P.A.

(57) ABSTRACT

Embodiments of the invention include a method of performing a bonus event in a gaming machine that produces a gaming outcome. The method for performing a bonus event includes displaying a three-dimensional character; modifying the character based on one or more user selections; and controlling the character to influence the gaming outcome.

24 Claims, 4 Drawing Sheets

U.S. PATENT DOCUMENTS

| | | | | |
|---|---|---|---|---|
| 6,406,369 | B1 * | 6/2002 | Baerlocher et al. | 463/20 |
| 6,592,457 | B1 | 7/2003 | Frohm et al. | |
| 6,634,948 | B1 * | 10/2003 | Hayashi et al. | 463/42 |
| 6,666,766 | B2 | 12/2003 | Baerlocher et al. | |
| 6,682,418 | B1 | 1/2004 | Mendes et al. | |
| 6,716,103 | B1 | 4/2004 | Eck et al. | |
| 6,811,482 | B2 | 11/2004 | Letovsky | |
| 6,866,585 | B2 | 3/2005 | Muir | |
| 6,886,585 | B1 | 5/2005 | King, Jr. et al. | |
| 6,887,157 | B2 | 5/2005 | LeMay et al. | |
| 6,896,615 | B2 | 5/2005 | Berman | |
| 7,128,648 | B2 * | 10/2006 | Watanabe | 463/20 |
| 2001/0021665 | A1 | 9/2001 | Gouji et al. | |
| 2001/0029202 | A1 | 10/2001 | Kondo et al. | |
| 2002/0034976 | A1 | 3/2002 | Webb | |
| 2002/0103024 | A1 | 8/2002 | Jeffway et al. | |
| 2002/0111212 | A1 | 8/2002 | Muir | |
| 2003/0003987 | A1 | 1/2003 | Estes et al. | |
| 2003/0032479 | A1 | 2/2003 | LeMay et al. | |
| 2003/0064781 | A1 | 4/2003 | Muir | |
| 2003/0064799 | A1 | 4/2003 | Goins et al. | |
| 2003/0087690 | A1 | 5/2003 | Loose et al. | |
| 2003/0100358 | A1 | 5/2003 | Kaminkow | |
| 2004/0002380 | A1 | 1/2004 | Brosnan et al. | |
| 2004/0023714 | A1 | 2/2004 | Asdale | |
| 2004/0033829 | A1 | 2/2004 | Pacey et al. | |
| 2004/0053686 | A1 | 3/2004 | Pacey et al. | |
| 2004/0077404 | A1 | 4/2004 | Schlottmann et al. | |
| 2004/0080507 | A1 | 4/2004 | Prittwiz | |
| 2004/0102244 | A1 | 5/2004 | Kryuchkov et al. | |
| 2004/0102245 | A1 | 5/2004 | Escalera et al. | |
| 2004/0130525 | A1 | 7/2004 | Suchocki | |
| 2004/0166936 | A1 | 8/2004 | Rothschild et al. | |
| 2004/0176164 | A1 | 9/2004 | Kobayashi et al. | |
| 2004/0192430 | A1 | 9/2004 | Burak et al. | |
| 2004/0233192 | A1 | 11/2004 | Hopper | |
| 2004/0266536 | A1 | 12/2004 | Mattice et al. | |
| 2005/0037843 | A1 | 2/2005 | Wells et al. | |
| 2005/0059487 | A1 | 3/2005 | Wilder et al. | |
| 2005/0075167 | A1 | 4/2005 | Beaulieu et al. | |
| 2005/0215319 | A1 | 9/2005 | Rigopulos et al. | |
| 2005/0233799 | A1 | 10/2005 | LeMay et al. | |
| 2005/0255908 | A1 | 11/2005 | Wells | |
| 2006/0052152 | A1 | 3/2006 | Tedsen et al. | |
| 2008/0108413 | A1 | 5/2008 | Gelber et al. | |
| 2009/0181769 | A1 | 7/2009 | Thomas et al. | |
| 2009/0291731 | A1 | 11/2009 | Jaffe et al. | |
| 2009/0298568 | A1 | 12/2009 | Pacey et al. | |

FOREIGN PATENT DOCUMENTS

| | | | |
|---|---|---|---|
| WO | WO-2004002591 | A2 | 1/2004 |
| WO | WO-2004/025589 | A2 | 3/2004 |
| WO | WO-2004028650 | A1 | 4/2004 |
| WO | WO-2004029893 | A1 | 4/2004 |
| WO | WO-2006039257 | A1 | 4/2006 |
| WO | WO-2006039324 | A2 | 4/2006 |
| WO | WO-2006039324 | A3 | 4/2006 |
| WO | WO-2006039348 | A1 | 4/2006 |
| WO | WO-2007/146264 | A2 | 12/2007 |
| WO | WO-2007146264 | A2 | 12/2007 |
| WO | WO-2007146264 | A3 | 12/2007 |

OTHER PUBLICATIONS

MAchine Translation of 2002-52169, 6 pages.*
"Australian Application Serial No. 2005292062, Examiner's First Report mailed Jun. 24, 2008", 3 pgs.
"Australian Application Serial No. 2005292085, Examiner's First Report mailed Jul. 18, 2008", 2 pgs.
"Australian Application Serial No. 2005292264, Examiner's First Report mailed Jun. 19, 2008", 2 pgs.
"International Application Serial No. PCT/US05/34545, International Search Report mailed Feb. 22, 2006", 3 pgs.
"International Application Serial No. PCT/US05/34545, Written Opinion mailed Feb. 22, 2006", 4 pgs.
"International Application Serial No. PCT/US05/34773, International Search Report mailed Apr. 28, 2006", 2 pgs.
"International Application Serial No. PCT/US05/34773, Written Opinion mailed Apr. 28, 2006", 5 pgs.
"International Application Serial No. PCT/US05/34847, International Search Report mailed Mar. 8, 2006", 2 pgs.
"International Application Serial No. PCT/US05/34847, Written Opinion mailed Mar. 8, 2006", 6 pgs.
"International Application Serial No. PCT/US05/34939, International Search Report mailed Mar. 28, 2006", 2 pgs.
"International Application Serial No. PCT/US05/34939, Written Opinion mailed Mar. 28, 2006", 6 pgs.
"U.S. Appl. No. 11/664,180, Non-Final Office Action mailed Sep. 18, 2009", 12 pgs.
"U.S. Appl. No. 11/664,180, Preliminary Amendment filed Mar. 29, 2007", 3 pgs.
"U.S. Appl. No. 11/664,180, Response filed Jan. 15, 2010 to Non Final Office Action mailed Sep. 18, 2009", 8 pgs.
"U.S. Appl. No. 11/664,180, Supplemental Preliminary Amendment filed May 18, 2009", 6 pgs.
"U.S. Appl. No. 11/664,440, Non-Final Office Action mailed Jun. 1, 2009", 17 pgs.
"U.S. Appl. No. 11/664,440, Response filed Jun. 29, 2009 to Non Final Office Action mailed Jun. 1, 2009", 13 pgs.
"Application Serial No. 2005292062, Subsequent Examiners Report mailed Jun. 25, 2009", 3 pgs.
"Application Serial No. 2005292133, Examiner Report Mailed Dec. 9, 2008", 2 pgs.
"Australia application No. 2005292062, examiner report mailed on Jun. 25, 2009", 3 pgs.
"Australian Application Serial No. 2005292085, Response filed Sep. 3, 2008 to Examiner's First Report mailed Jul. 18, 2008", 12 pgs.
"Australian Application Serial No. 2005292133, Office Action mailed Apr. 30, 2009", 2 pgs.
"International Application Serial No. PCT/US2007/013742, Written Opinion mailed Sep. 2, 2008", 4 pgs.
"U.S. Appl. No. 11/664,180 Non-Final Office Action mailed Mar. 15, 2010", 23 pgs.
"U.S. Appl. No. 11/664,180, Response filed Aug. 13, 2010 to Non Final Office Action mailed Mar. 15, 2010", 6 pgs.
"U.S. Appl. No. 11/664,440, Non-Final Office Action mailed May 27, 2010", 12 pgs.
"U.S. Appl. No. 11/664,180 Final Office Action mailed Oct. 26, 2010", 11 pgs.
"U.S. Appl. No. 11/664,440, Response filed Nov. 29, 2010 to Final Office Action mailed May 27, 2010 ", 9 pgs.
"U.S. Appl. No. 11/664,400 Restriction Requirement mailed Sep. 17, 2010", 9.

* cited by examiner

DISPLAYING 3D CHARACTERS IN GAMING MACHINES

RELATED APPLICATION

This application is a U.S. National Stage Filing under 35 U.S.C. 371 from International Patent Application Serial No. PCT/US2005/034939, filed Sep. 28, 2005, and published on Apr. 13, 2006 as WO 2006/039371 A2, and republished on Apr. 13, 2006 as WO 2006/039371 A3, which claims the priority benefit of U.S. Provisional Application Ser. No. 60/615,216 filed Oct. 1, 2004, the contents of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2003, WMS Gaming, Inc. All Rights Reserved.

BACKGROUND OF THE INVENTION

1. Field of the Invention

This patent application pertains generally to gaming systems, and more particularly, but not by way of limitation, to a system and method for displaying three-dimensional characters in a gaming machine.

2. Background Information

Video gaming machines are popular within the gaming industry. They typically are operable to play traditional games such as slots, poker, bingo, keno and blackjack. Such machines have been enhanced in recent years by adding effects that make them more attractive, exciting and entertaining.

Effects for video games fall broadly into two categories: reel spin and bonus events. Reel spin effects usually rely on visual changes within the image representing the reel in a slot machine. Bonus events occur outside the reel spin, injecting either a random event or fostering some player interaction to trigger a random event.

The graphical capabilities of processors have increased dramatically over the last decade. At the same time, there is a continuing need to develop new and exciting effects for video gaming machines. What is needed is a way of harnessing the graphics power of processors to introduce new and innovative features in video gaming machines.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
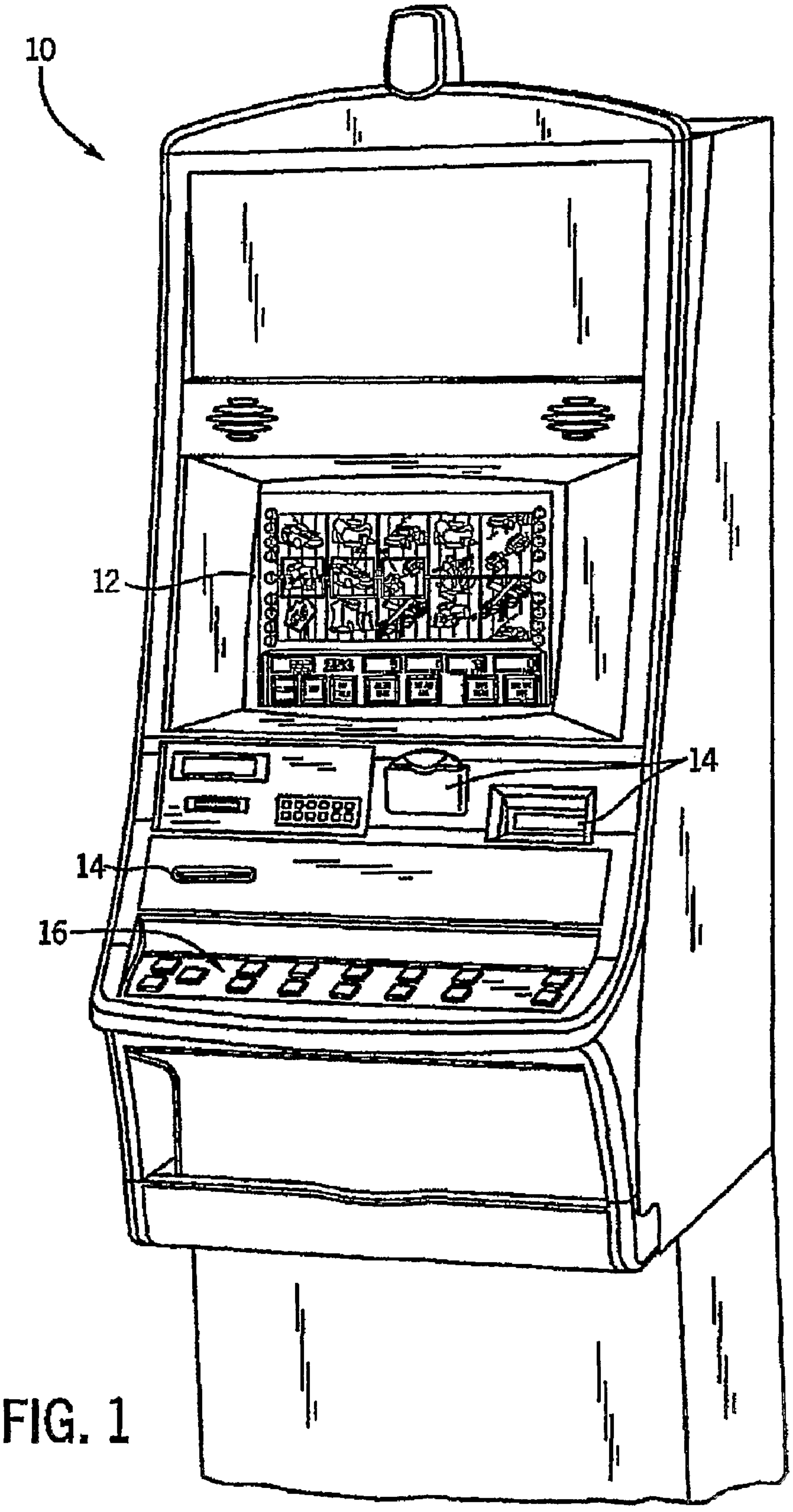
FIG. 1 illustrates a gaming machine according to the present invention.

FIG. 1 illustrates an exemplary video gaming machine 10, also referred to as a Video Lottery Terminal (VLT), in which embodiments of the invention may be implemented. In some embodiments, gaming machine 10 is operable to conduct a wagering game such as mechanical or video slots, poker, keno, bingo, or blackjack. The gaming machine 10 shown in FIG. 1 includes a video display 12 such as a cathode ray tube (CRT), liquid crystal display (LCD), plasma, or other type of video display known in the art. In one such embodiment, a touch screen overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

Gaming machine 10 includes one or more credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money. In some embodiments, credit receiving mechanism 14 receives credits through a network interface.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
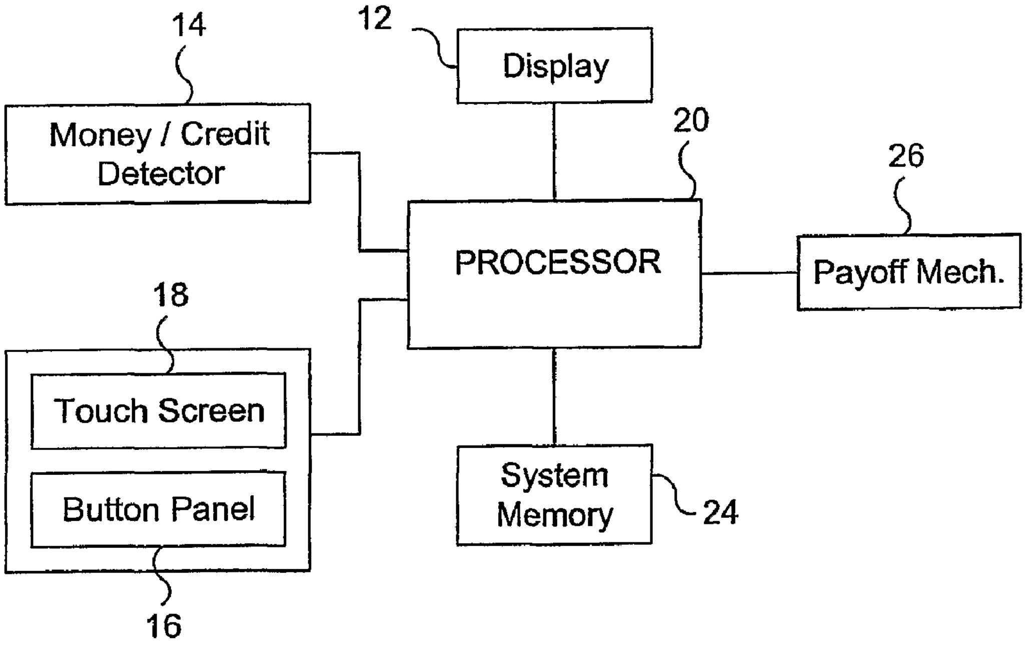
FIG. 2 is a block diagram of a control system suitable for operating the gaming machine of FIG. 1.

FIG. 2 is a block diagram of a control system suitable for operating the gaming machine 10. Money/credit detector 22 signals a processor 20 when a player has inserted money, tickets, tokens, cards or other mechanism for obtaining credits for plays on the gaming machine through credit mechanisms 14. Using a button panel 16 and/or a touch screen 18, the player may select any variables associated with the wagering game and place his/her wager to purchase a play of the game. In a play of the game, the processor 20 generates at least one random event using a random number generator (RNG) and provides an award to the player for a winning outcome of the random event.

Alternatively, the random event may be generated by a remote computer using an RNG or pooling schema and then transmitted to the gaming machine. The processor 20 operates the display 12 to represent the random event(s) and outcome(s) in a visual form that can be understood by the player. In addition to the processor 20, the control system may include one or more additional slave control units for operating the display 12 and any secondary displays.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure.

A payoff mechanism 26 is operable in response to instructions from the processor 20 to award a payoff to the player. The payoff may, for example, be in the form of a number of credits. The number of credits is determined by one or more math tables stored in the system memory 24.

In one embodiment, gaming machine 10 includes three-dimensional characters. Three dimensional effects have been used in previous gaming machines. Effects to date have, however, relied on pre-rendered presentations of three-dimensional images. The use of pre-rendered images limited the types of user interaction that could be handled and, therefore, was view as somewhat gimmicky. Gaming machines 10 according to the present invention generate their three-dimensional effects in real-time. The result is a much more interactive and interesting environment for the gaming player.

In one embodiment, the three-dimensional characters are implemented using a game design package such as RenderWare Studio 2.0 running, for example, on a processor designed by Intel or AMD. These characters are used to add excitement to, for example, bonus events.

Figure 3:
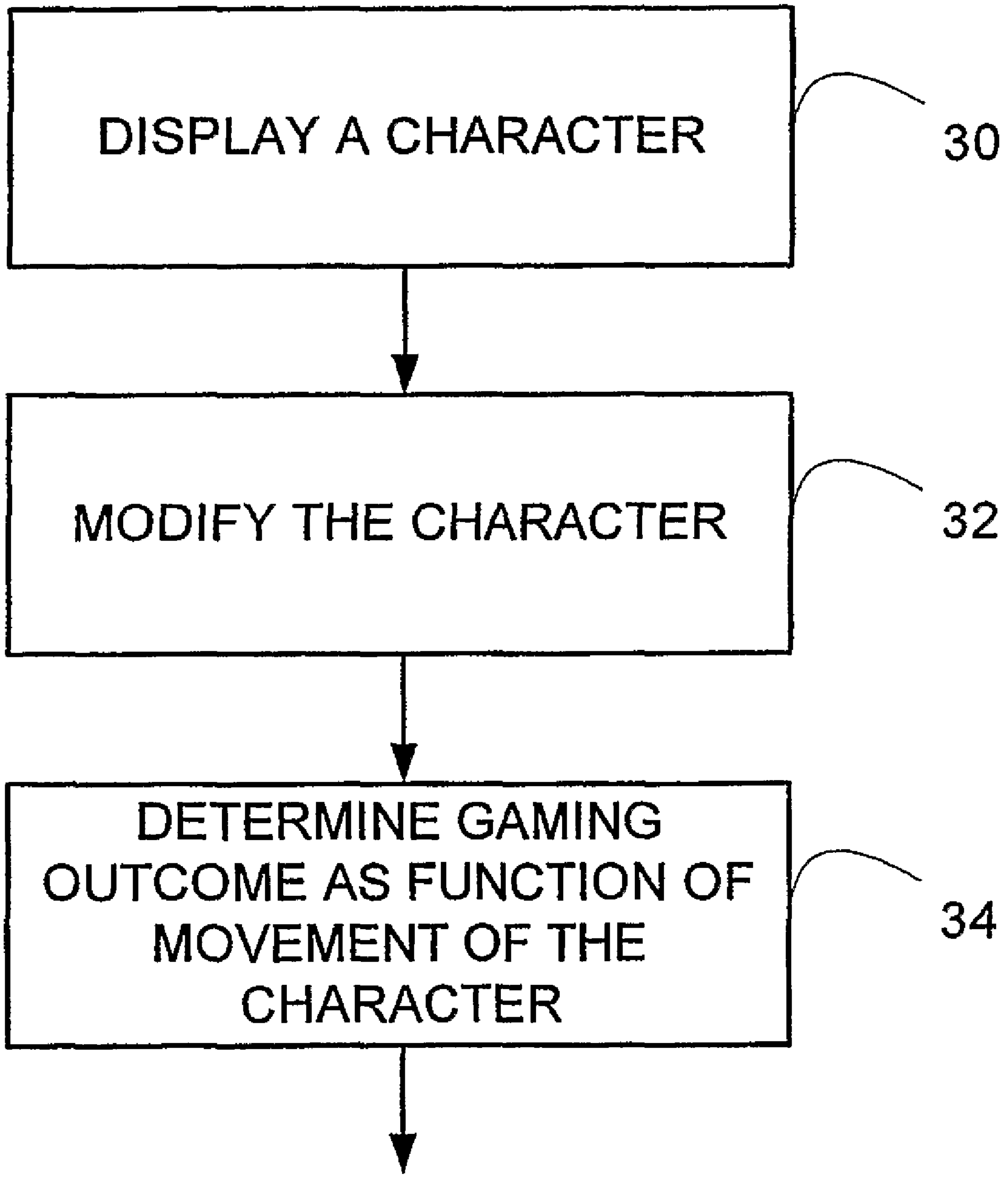
FIGS. 3 and 4 illustrates methods of displaying and controlling three-dimensional characters according to the present invention.

In one embodiment, a player selects an avatar from player selectable and configurable avatars. In one such embodiment, as shown in FIG. 3, processor 20 displays the character at 30 and the player selects from attributes such as gender, race, dress and facial features at 32. In one embodiment, players are also given the ability to morph the avatar by, for example, elongating, coloring, shading, or twisting facial or body parts. The selected character is then used at 34 to determine a game outcome as a function of movement of the character.

One approach to add excitement to the game is to have player-selected features determine the prizes that are accessible to the player. For example, if they create a tall avatar, it can reach a prize up in a tree, but can't get through a doorway for other prizes. The opposite is true for a short avatar. Player controllable emotional responses. Player can have their avatar show happiness or dismay over the size of an award. Especially important for games with multiple players, or the avatar can be viewed on a more public display (overhead sign).

Another approach is to use an avatar's equipment, dress or size as visible representations of wealth. As the player wins during a bonus, the avatar's appearance will reflect the amount. For example, a Robin Hood-type game might use golden helmets or a giant bow to show how successful the player is.

In one embodiment, gaming machine 10 is connected to a network. In such an embodiment, players configure characters through a website for use on a gaming machine. In one such embodiment, each gaming machine 10 is connected to a server; the player's avatar is, therefore, available on any terminal supporting avatar games. Player can configure their avatar from home. In one embodiment, players configure their avatar using their own graphics/sound files.

In one embodiment, gaming machine 10 includes a user interface device that tracks certain user movements. In one such embodiment, the avatar mimics players movements captured, for instance, using a video camera (e.g., Sony's EyeToy). Sony's EyeToy (or equivalent) tracks the players actions to make picks, direct the avatar, dance, etc.

In one embodiment, each avatar has a pet and the actions of the pet effect the game outcome.

In one embodiment, players control an avatar's emotional response. Players can have their avatar show happiness or dismay over the size of an award. Such a capability is especially important for games with multiple players, or the avatar can be viewed on a more public display (overhead sign)

More than one character could be used in a bonus event. In one embodiment, gaming machine 10 allows simultaneous control of multiple characters by a player. The player gives characters goals or tasks to carry out.

Figure 4:
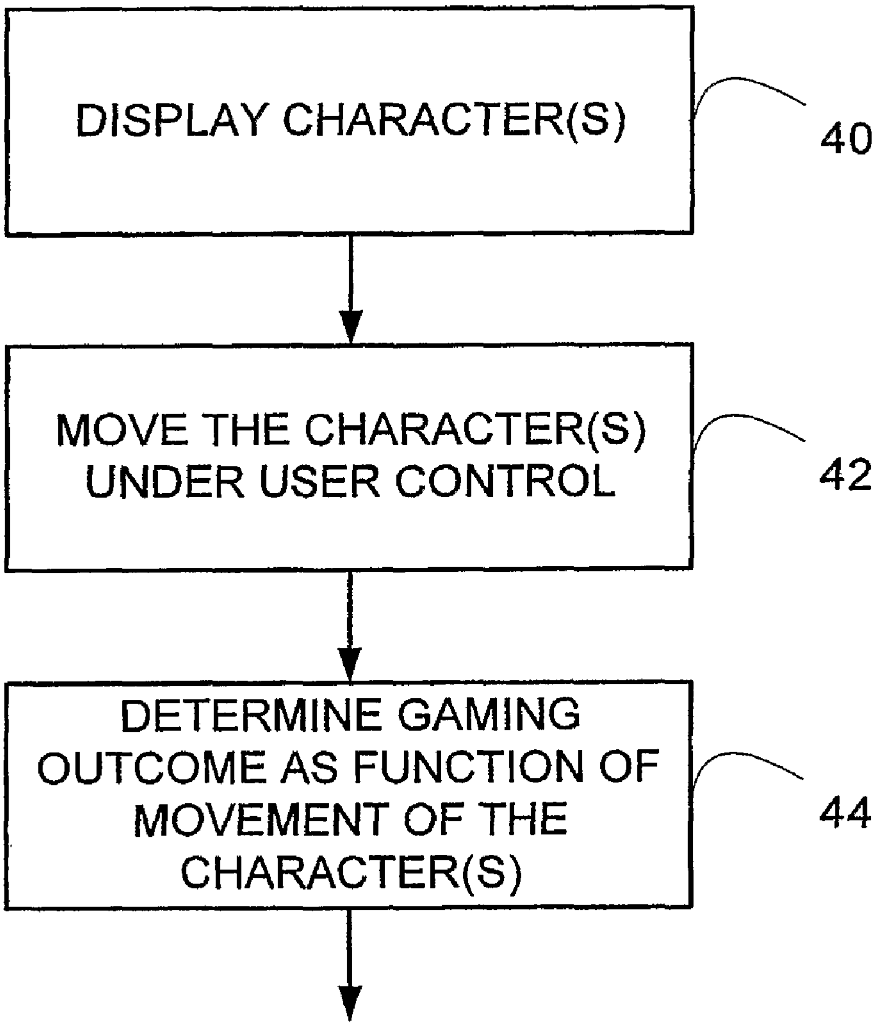

In one such embodiment, the player selects the character they wish to control; the game controls the others using, for instance, some form of artificial intelligence. The player's character performs its actions based on player input. The other characters then react to the player's characters and/or make independent actions in order to create a gaming outcome. One such approach is shown in FIG. 4. In the embodiment shown in FIG. 4, one or more characters are displayed at 40, the characters are moved under user control at 42 and the movement and interaction between characters is used to determine the gaming outcome at 44.

In one embodiment, two or more players interacting in a single scene. In one such embodiment, each player looks on the same scene but controls different characters within that scene. Game play is either cooperative or competitive. Examples of each include building a common tower, or competing at tug-of-war.

In one such embodiment, two or more gaming machines 10 are connected over a network. The scene being displayed for each player is shown as a composite scene for the entertainment of people watching the action.

Such an approach also creates the possibility of controlling a game outcome as a function of multiple characters attempting to control the same object within a scene, either simultaneously, or by taking turns. Tug-of-war is again an example. Another example is the moving of pieces to solve a puzzle.

In one embodiment, the scene the player sees is enhanced through the use of dynamic camera effects used while tracking the character being controlled by the player. In one such embodiment, the player selects the character to be shown/followed and the camera angle or point of view. Some effects include chase, rubberbanding and overhead shots. In one embodiment, a zoom feature can be used by the player to open a new game (e.g., by allowing the player to introduce a new game by zooming into a little screen).

Excitement can also be added through the use of three-dimensional lighting effects. In one embodiment, an avatar aims a directional lights source (e.g., by aiming a flashlight or a search light). Prizes are revealed by controlling the beam of light to the values. In another embodiment, an avatar holds or manipulates a general light source (e.g. a torch or a fire). Available light limits the players field of view and therefore restricts the pick field.

Excitement can also be added by adding real or apparent randomness to character movement. There are a variety of methods available to control how a character moves within a scene, including: pointing to the destination, using button controls, pointing to a series of way points. In one embodiment, key frame interpolation is used to smooth out transitions between character actions.

In one embodiment, gaming machine 10 includes the ability for players to combine three-dimensional objects into a single object which either shares the attributes of the pieces, and/or creates new attributes.

Texture mapping can also be used to enhance the game experience. In one embodiment, texture mapping is performed in real-time to customize characters for a particular casino location in a realistic way.

In the above discussion, the term "processor" is defined to include any digital or analog data processing unit. Examples include any microprocessor or microcontroller capable of embodying the inventions described herein.

Examples of articles comprising machine readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method, in a slot-machine like gaming machine that produces a gaming outcome, comprising:

displaying a reel spin effect;

displaying a bonus effect separate from the reel spin effect, wherein displaying a bonus effect includes presenting a three-dimensional character and displaying two or more prizes, wherein the two or more prizes displayed include a first displayed prize and a second displayed prize;

modifying characteristics of the character based on one or more user selections;

controlling the character to influence the gaming outcome of the bonus effect, wherein controlling the character includes determining a payoff for the user as a function of one or more characteristics of the character selected by the user, wherein the one or more characteristics selected by the user determine prizes that are accessible to the user, wherein certain characteristics selected by the user prevent the character from accessing the first displayed prize while permitting the character to access the second displayed prize and wherein the payoff is a function of the prizes accessed by the user's character; and awarding the payoff to the user according to the gaming outcome.

2. The method of claim 1, wherein the three-dimensional character is generated in real time.

3. The method of claim 1, wherein the three-dimensional character is selected from selectable and configurable avatars.

4. The method of claim 1, wherein the character is modifiable by elongating, coloring, shading or twisting facial or body parts of the character.

5. The method of claim 1, wherein emotion attributes displayed by the character are modifiable.

6. The method of claim 1, wherein characters are modified through a website for use on the gaming machine.

7. The method of claim 6, wherein the gaming machine is connected to a server.

8. The method of claim 7, wherein the character is available on any terminal supporting avatar games.

9. The method of claim 7, wherein the character is modifiable by a user from the user's home.

10. The method of claim 7, wherein a portion of a composite scene is viewable on a gaming machine.

11. The method of claim 1, wherein user movements are tracked by a user interface.

12. The method of claim 11, wherein the character mimics the user movements.

13. The method of claim 1, comprising more than one character.

14. The method of claim 13, comprising simultaneous control of multiple characters.

15. The method of claim 13, wherein the gaming machine controls some of the characters.

16. The method of claim 13, wherein the user controls some of the characters.

17. The method of claim 1, wherein determining a payoff for the user includes modifying the one or more characteristics of the character according to an amount of the payoff.

18. The method of claim 17, wherein modifying the one or more of the characteristics of the character includes modifying an appearance of the character to reflect the amount of the payoff.

19. The method of claim 17, wherein modifying the one or more of the characteristics of the character includes modifying an emotion of the character to reflect the amount of the payoff.

20. The method of claim 19, wherein the emotion includes dismay over the amount of the payoff.

21. An article comprising a machine readable medium having instructions thereon, wherein the instructions, when executed in a computer, create a system for executing the method of claim 1.

22. A method in a slot-machine like gaming machine that produces a gaming outcome on a display, comprising:

displaying a reel spin effect;

displaying a bonus effect separate from the reel spin effect, wherein displaying a bonus effect includes presenting one or more three-dimensional characters and displaying two or more prizes, wherein the two or more prizes displayed include a first displayed prize and a second displayed prize;

moving one of the characters under player control;

determining the gaming outcome of the bonus effect as a function of movement of the character within the display, wherein determining includes deciding a payoff for the user as a function of one or more characteristics of the character selected by the user, wherein the one or more characteristics selected by the user determine prizes that are accessible to the user, wherein certain characteristics selected by the user prevent the character from accessing the first displayed prize while permitting the character to access the second displayed prize and wherein the payoff is a function of the prizes accessed by the user's character; and awarding the payoff to the user according to the gaming outcome.

23. An article comprising a machine readable medium having instructions thereon, wherein the instructions, when executed in a computer, create a system for executing the method of claim 22.

24. A slot-machine like gaming device, comprising:

a display unit to display a reel spin effect and a bonus effect separate from the reel spin effect, wherein displaying a bonus effect includes presenting a three-dimensional character and displaying two or more prizes, wherein the two or more prizes includes a first displayed prize and a second displayed prize;

a processing unit, operatively coupled to the display unit, to modify characteristics of the character based on one or more user selections and to control the character to influence the gaming outcome of the bonus effect, wherein controlling the character includes determining a payoff for the user as a function of one or more characteristics of the character selected by the user, wherein the one or more characteristics selected by the user determine prizes that are accessible to the user, wherein certain characteristics selected by the user prevent the character from accessing the first displayed prize while permitting the character to access the second displayed prize and wherein the payoff is a function of the prizes accessed by the user's character; and a paying-off unit to award the payoff to the user according to the gaming outcome.

* * * * *

UNITED STATES PATENT AND TRADEMARK OFFICE

CERTIFICATE OF CORRECTION

PATENT NO. : 7,874,900 B2
APPLICATION NO. : 11/664185
DATED : January 25, 2011
INVENTOR(S) : Matthew J. Ward et al.

It is certified that error appears in the above-identified patent and that said Letters Patent is hereby corrected as shown below:

In column 4, line 15, after "sign)" insert -- . --.

Signed and Sealed this
Fifth Day of April, 2011

David J. Kappos
*Director of the United States Patent and Trademark Office*